US012744366B2

(12) United States Patent
Sato et al.

(10) Patent No.: US 12,744,366 B2
(45) Date of Patent: Sep. 22, 2026

(54) TANK-TYPE CIRCUIT BREAKER

(71) Applicant: Mitsubishi Electric Corporation, Tokyo (JP)

(72) Inventors: Motohiro Sato, Tokyo (JP); Yasunori Nakamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 340 days.

(21) Appl. No.: 18/681,970

(22) PCT Filed: Sep. 28, 2021

(86) PCT No.: PCT/JP2021/035612
§ 371 (c)(1),
(2) Date: Feb. 7, 2024

(87) PCT Pub. No.: WO2023/053191
PCT Pub. Date: Apr. 6, 2023

(65) Prior Publication Data
US 2024/0339818 A1 Oct. 10, 2024

(51) Int. Cl.
*H02B 13/035* (2006.01)

(52) U.S. Cl.
CPC ................................ *H02B 13/0354* (2013.01)

(58) Field of Classification Search
CPC ........ H01H 1/50; H01H 33/025; H01H 33/56; H01H 33/666; H01H 33/6606;

(Continued)

(56) References Cited

U.S. PATENT DOCUMENTS 4,434,332 A * 2/1984 Yanabu ................ H01H 33/143 218/144
4,458,119 A * 7/1984 Hashimoto .......... H01H 33/143 218/3
8,110,770 B2 2/2012 Ichikawa et al.
8,723,070 B2 * 5/2014 Yoshida ............. H02B 13/0354 218/155

(Continued)

FOREIGN PATENT DOCUMENTS

JP H0417607 U 2/1992
JP H11176304 A 7/1999

(Continued)

OTHER PUBLICATIONS

International Search Report (PCT/ISA/210) with translation and Written Opinion (PCT/ISA/237) mailed on Dec. 7, 2021, by the Japan Patent Office as the International Searching Authority for International Application No. PCT/JP2021/035612. (9 pages).

*Primary Examiner* — William A Bolton
(74) *Attorney, Agent, or Firm* — Buchanan Ingersoll & Rooney PC

(57) ABSTRACT

A tank-type circuit breaker includes a cylindrical grounded tank in which an insulating gas is sealed, a vacuum valve insulated and supported in the grounded tank and including a movable-side contact and a fixed-side contact, a movable conductor electrically connected to the movable-side contact, a fixed conductor electrically connected to the fixed-side contact, a movable-side external conductor and a fixed-side external conductor disposed in a pair of bushings extending above the grounded tank, a movable-side frame electrically connecting the lower end of the movable-side external conductor to the movable conductor, and a fixed-side frame electrically connecting the lower end of the fixed-side external conductor to the fixed conductor. The fixed-side frame and the fixed-side external conductor are connected via at least two springs arranged in series along an extending direction of the fixed-side external conductor, so (Continued)

that the fixed-side frame is suspended and supported by the fixed-side external conductor.

5 Claims, 2 Drawing Sheets

(58) Field of Classification Search
CPC .. H01H 33/143; H01H 33/021; H01H 33/596; H01H 33/122; H01H 2033/6665; H02B 13/0354; H02B 13/0358; H02B 13/035; H02B 13/075
USPC .... 218/7, 10, 33, 45, 55, 97, 100, 134, 139, 218/155
See application file for complete search history.

(56) References Cited

U.S. PATENT DOCUMENTS 9,806,504 B2 * 10/2017 Yoshitomo ......... H02B 13/0358
10,262,819 B2 * 4/2019 Nagatake .................. C22C 9/00
10,978,263 B1 * 4/2021 Cuppett ................... H01H 3/54
2012/0103941 A1 5/2012 Nakayama et al.
2012/0160810 A1 6/2012 Ohtsuka et al.
2014/0076851 A1 * 3/2014 Yano ...................... H01H 33/40 218/120
2014/0374383 A1 * 12/2014 Shioiri ............. H01H 33/66207 218/139

FOREIGN PATENT DOCUMENTS

JP 2007306701 A 11/2007
JP 2010178526 A 8/2010
WO 2011052010 A1 5/2011
WO 2011052288 A1 5/2011

* cited by examiner 100
2b
22b
19
18A
18B
15
21b
17
14
14P
16
41
23
20b
5b
5a
3
20a
4
19
1
21a
13
22a
9
12
8
2a
11
10

TANK-TYPE CIRCUIT BREAKER

FIELD

The present disclosure relates to a tank-type circuit breaker including an arc-extinguishing chamber.

BACKGROUND

In a tank-type circuit breaker such as a vacuum circuit breaker or a gas circuit breaker, an arc-extinguishing chamber for interrupting current is housed in a grounded tank. In the tank-type circuit breaker, the arc-extinguishing chamber is supported in the grounded tank by support insulators at two places on the side where a movable-side contact is disposed and on the side where a fixed-side contact is disposed.

On the side where the fixed-side contact is disposed, the disposition of the support insulator complicates the structure and assembly of a support part using insulating material and increases the size of the tank-type circuit breaker. Therefore, it has been desired to support the arc-extinguishing chamber in the grounded tank while suppressing an increase in the size of the tank-type circuit breaker.

For example, in a tank-type circuit breaker described in Patent Literature 1, the fixed side of an arc-extinguishing chamber is suspended and supported by a bushing conductor, thereby suppressing an increase in the size of the tank-type circuit breaker.

CITATION LIST

Patent Literature

Patent Literature 1: Japanese Patent Application Laid-open No. 2007-306701

SUMMARY OF INVENTION

Technical Problem

However, in the technique of Patent Literature 1, the fixed side of the arc-extinguishing chamber is fastened to the bushing conductor with screws. When vibration is generated at the time of opening or closing the circuit breaker, an impact load acts on the screws and can damage portions fastened with the screws. In addition, when the temperature of the bushing conductor increases and the length of the bushing conductor increases at the time of current-carrying of the circuit breaker, the arc-extinguishing chamber is pushed down by the amount of the increase in the length of the bushing conductor. A load is applied to fastened portions of parts constituting the arc-extinguishing chamber, and can damage the fastened portions. Thus, the technique of Patent Literature 1 has a problem that the fastened portions of the parts may be damaged when a force is applied to the fastened portions of the parts due to the vibration of the circuit breaker, the increased length of the bushing conductor, etc.

The present disclosure has been made in view of the above. It is an object of the present disclosure to provide a tank-type circuit breaker that prevents fastened portions of parts from being damaged with a small device configuration.

Solution to Problem

To solve the above-described problem and achieve the object, a tank-type circuit breaker of the present disclosure includes: a cylindrical grounded tank in which an insulating gas is sealed; a contact insulated and supported in the grounded tank and including a movable-side contact and a fixed-side contact; a movable conductor electrically connected to the movable-side contact; and a fixed conductor electrically connected to the fixed-side contact. The tank-type circuit breaker of the present disclosure also includes: a movable-side external conductor and a fixed-side external conductor disposed in a pair of bushings extending above the grounded tank, respectively; a movable-side frame configured to electrically connect the lower end of the movable-side external conductor to the movable conductor; a fixed-side frame configured to electrically connect the lower end of the fixed-side external conductor to the fixed conductor; and a movable-side insulating support tube configured to insulate and support the movable-side frame in the grounded tank. The fixed-side frame and the fixed-side external conductor are connected via at least two elastics arranged in series along an extending direction of the fixed-side external conductor, so that the fixed-side frame is suspended and supported by the fixed-side external conductor.

Effects of the Invention

The tank-type circuit breaker according to the present disclosure has the effect of preventing fastened portions of parts from being damaged with a small device configuration.

DESCRIPTION OF EMBODIMENTS

Hereinafter, a tank-type circuit breaker according to embodiments of the present disclosure will be described in detail with reference to the drawings.

First Embodiment

Figure 1:
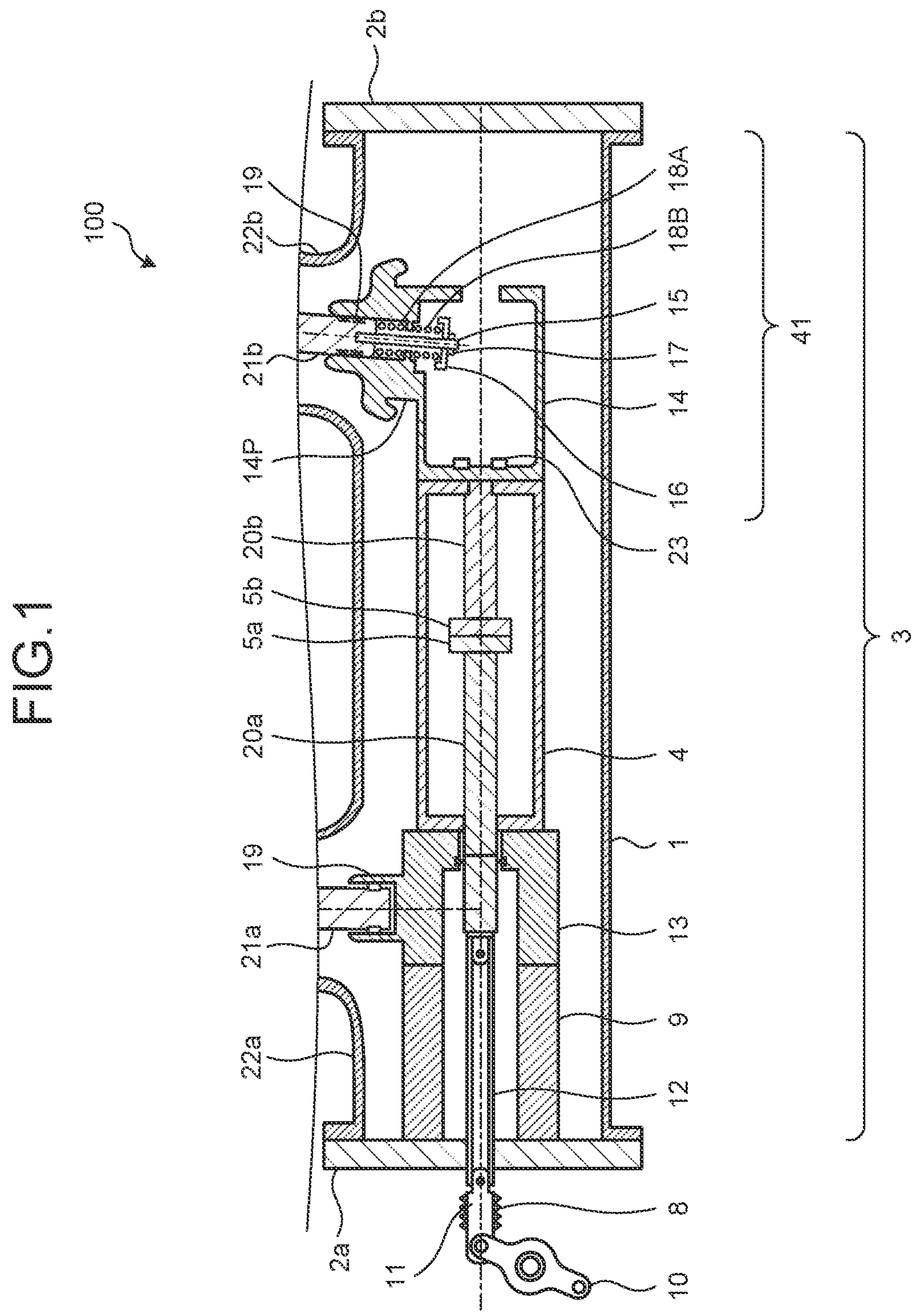
FIG. 1 is a diagram illustrating a configuration of a tank-type circuit breaker according to a first embodiment.
Figure 2:
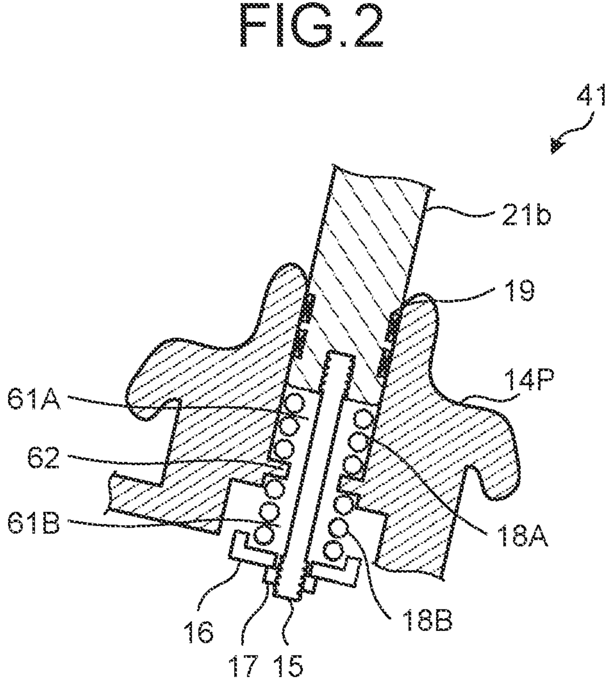
FIG. 2 is a diagram illustrating a configuration of a holder included in the tank-type circuit breaker according to the first embodiment.

FIG. 1 is a diagram illustrating a configuration of a tank-type circuit breaker according to a first embodiment. FIG. 2 is a diagram illustrating a configuration of a holder included in the tank-type circuit breaker according to the first embodiment. The first embodiment describes a case where a tank-type circuit breaker 100 is a vacuum circuit breaker. However, the tank-type circuit breaker 100 may be a circuit breaker other than a vacuum circuit breaker such as a gas circuit breaker or an air-blast circuit breaker.

As illustrated in FIG. 1, the tank-type circuit breaker 100 according to the first embodiment includes: a cylindrical grounded tank 1 in which an insulating gas is sealed; and a contact insulated and supported in the grounded tank 1 and including a movable-side contact **5*a* and a fixed-side contact 5*b*. In the first embodiment, since the tank-type circuit breaker 100 is a vacuum circuit breaker, the contact is a vacuum valve 4. In the grounded tank 1, the movable-side contact 5*a* and the left side of the movable-side contact 5*a* are the arc-extinguishing chamber movable side, and the fixed-side contact 5***b* and the right side of the fixed-side contact 5*b* are the arc-extinguishing chamber fixed side.

The tank-type circuit breaker 100 also includes: a movable conductor 20*a* electrically connected to the movable-side contact 5*a*; a fixed conductor 20*b* electrically connected to the fixed-side contact 5*b*; and a pair of bushings extending above the grounded tank 1. The pair of bushings are connected to a movable-side branch pipe 22*a* and a fixed-side branch pipe 22*b* of the grounded tank 1. A movable-side external conductor 21*a* is disposed in the movable-side branch pipe 22*a*. A fixed-side external conductor 21*b* is disposed in the fixed-side branch pipe 22*b*. The movable-side external conductor 21*a* and the fixed-side external conductor 21*b* are bushing conductors.

The tank-type circuit breaker 100 also includes: a movable-side frame 13 configured to electrically connect the lower end of the movable-side external conductor 21*a* to the movable conductor 20*a*; and a fixed-side frame 14 configured electrically connect the lower end of the fixed-side external conductor 21*b* to the fixed conductor 20*b*. The movable-side frame 13 is electrically connected to the movable-side contact 5*a* via the movable conductor 20*a*. The fixed-side frame 14 is electrically connected to the fixed-side contact 5*b* via the fixed conductor 20*b*.

The tank-type circuit breaker 100 also includes: an insulated operating rod 12 connected to an operating device 10 outside the grounded tank 1 to operate the movable-side contact 5*a*; and a movable-side insulating support tube 9 configured to insulate and support the movable-side frame 13 in the grounded tank 1.

In the tank-type circuit breaker 100 of the first embodiment, the fixed-side frame 14 is suspended and supported by the fixed-side external conductor 21*b*. Consequently, the tank-type circuit breaker 100 does not include a fixed-side insulating support tube that insulates and supports the fixed-side frame 14 in the grounded tank 1. Thus, the tank-type circuit breaker 100 does not include the fixed-side insulating support tube and is reduced in size.

The movable-side end of the grounded tank 1 is covered with a movable-side flange 2*a* in which a hole through which the insulated operating rod 12 passes is formed. The fixed-side end of the grounded tank 1 is covered with a fixed-side flange 2*b*. An arc-extinguishing chamber 3: is configured by connecting the movable-side insulating support tube 9, the movable-side frame 13, the vacuum valve 4, and the fixed-side frame 14; and is housed in the grounded tank 1. The vacuum valve 4 is fixed to the fixed-side frame 14 with bolts 23. The vacuum valve 4 is fixed to the movable-side frame 13 with bolts (not illustrated).

The driving force of the operating device 10 is transmitted to the movable-side contact 5*a* via a connecting mechanism 11, the insulated operating rod 12, and the movable conductor 20*a*. Under the driving force of the operating device 10, the tank-type circuit breaker 100 is configured to take a closing state in which the movable-side contact 5*a* is in contact with the fixed-side contact 5*b*, and an interrupting state in which the movable-side contact 5*a* is separate from the fixed-side contact 5*b*.

A contact pressure spring 8 applies to the insulated operating rod 12 a force that presses the movable-side contact 5*a* against the fixed-side contact 5*b* at the time of contact closing. Consequently, current-carrying performance is ensured between the movable-side contact 5*a* and the fixed-side contact 5*b* at the time of contact closing.

In the tank-type circuit breaker 100 according to the first embodiment, the arc-extinguishing chamber 3 is supported in the grounded tank 1 using a holder 41 disposed on the fixed side. That is, the movable-side insulating support tube 9 is fixed to the movable-side flange 2*a*, and the fixed-side frame 14 is fixed to the fixed-side external conductor 21*b* using the holder 41, whereby the arc-extinguishing chamber 3 is insulated and supported in the grounded tank 1. That is, the arc-extinguishing chamber 3 is fixed to the grounded tank 1 at two places on the fixed side and on the movable side.

While the tank-type circuit breaker 100 is being assembled, the arc-extinguishing chamber 3 including the vacuum valve 4 is inserted into the grounded tank 1. After that, the fixed-side external conductor 21*b* is inserted into the fixed-side frame 14 attached to the fixed side of the vacuum valve 4. Then, the fixed-side external conductor 21*b* is fixed to the fixed-side frame 14.

The holder 41 includes: the fixed-side frame 14; springs 18A and 18B that are elastics; a current-carrying contact 19; a threaded rod 15; a nut 17; and a suppressing plate 16. The springs 18A and 18B are coil springs, disc springs, or the like. The springs 18A and 18B may be any springs as long as the springs, when compressed, generate a reaction force in a direction opposite to a compressed direction.

The fixed-side frame 14 extends toward the fixed-side flange 2*b* along the axial direction of the fixed conductor 20*b*, and extends toward the fixed-side external conductor 21*b* along the axial direction of the fixed-side external conductor 21*b*. Of the fixed-side frame 14, a member extending along the axial direction of the fixed conductor 20*b* is fixed to the fixed conductor 20*b*, and a member extending along the axial direction of the fixed-side external conductor 21*b* (hereinafter, referred to as a frame 14P) is connected to the fixed-side external conductor 21*b*. The frame 14P of the fixed-side frame 14 is a portion used for connection with the fixed-side external conductor 21*b*. Hereinafter, the axial direction of the fixed-side external conductor 21*b* is referred to as a holding axis direction. The holding axis direction may be a vertical direction or a direction inclined from the vertical direction.

In the holder 41, the outer wall surface of the fixed-side external conductor 21*b* and the inner wall surface of the frame 14P are connected via the current-carrying contact 19. The frame 14P is movably connected to the fixed-side external conductor 21*b* via the current-carrying contact 19. Specifically, the lower end of the fixed-side external conductor 21*b* is inserted into a cylindrical area of the frame 14P along the axial direction, and is movably connected to the frame 14P via the current-carrying contact 19.

Thus, the current-carrying contact 19 electrically connects the fixed-side frame 14 and the fixed-side external conductor 21*b* while allowing the movement of the frame 14P in the holding axis direction and the movement of the fixed-side external conductor 21*b* in the holding axis direction. In other words, the current-carrying contact 19 maintains an electrical connection between the fixed-side external conductor 21*b* and the fixed-side frame 14 even when the relative positions of the fixed-side external conductor 21*b* and the frame 14P in the holding axis direction shift. The current-carrying contact 19 is also called a multi-contact, a tulip contact, or a spring contact.

The frame 14P has a cylindrical shape. Into the top side thereof, a lower end portion of the fixed-side external conductor 21*b* in the shape of a rod is inserted. That is, the lower end portion of the fixed-side external conductor 21*b* is disposed in an upper section inside the frame 14P.

A middle section 61A inside the frame 14P is a cylindrical space, in which the spring 18A is disposed. The spring 18A is housed in the middle section 61A such that the axial direction is the same direction as the holding axis direction.

As illustrated in FIG. 2, a lower section 61B inside the frame 14P is a cylindrical space, in which the spring 18B is disposed. The spring 18B is housed in the lower section 61B such that the axial direction is the same direction as the holding axis direction.

Thus, the springs 18A and 18B are arranged in series along the axial direction of the fixed-side external conductor 21*b*. That is, the springs 18A and 18B are arranged in series from the lower end side of the fixed-side external conductor 21*b* along the extending direction of the fixed-side external conductor 21*b*.

Note that the lower section 61B may be an area below the frame 14P. In this case, the lower section 61B is an internal area of the fixed-side frame 14. The spring 18A is a first elastic, and the spring 18B is a second elastic.

A plate-shaped protrusion 62 is formed between the middle section 61A and the lower section 61B. The protrusion 62 has an annular shape. The protrusion 62 is formed to protrude toward the center from the inner wall surface of the frame 14P forming the cylindrical area. That is, the protrusion 62 extends from the inner wall surface of the frame 14P toward the central portion (central axis) of the cylindrical area of the frame 14P. A central area of the annular protrusion 62 is a disk-shaped space, through which the threaded rod 15 formed of rod is passed. The protrusion 62 prevents collisions between the spring 18A and the spring 18B.

The top surface of the protrusion 62 (the fixed-side external conductor 21*b* side) faces the bottom surface of the fixed-side external conductor 21*b*. The bottom surface of the protrusion 62 faces the top surface of the suppressing plate 16. The top surface of the protrusion 62 is parallel to the bottom surface of the fixed-side external conductor 21*b*. The bottom surface of the protrusion 62 is parallel to the top surface of the suppressing plate 16.

The bottom side of the spring 18A is pressed against the top surface of the protrusion 62. The top side of the spring 18B is pressed against the bottom surface of the protrusion 62. The top side of the spring 18A is pressed against the lower end portion (bottom surface) of the fixed-side external conductor 21*b*. The bottom side of the spring 18B is pressed against the top surface of the suppressing plate 16, which is an annular plate. In the first embodiment, the protrusion 62 is an annular portion.

The suppressing plate 16 is fixed to the lower end portion of the fixed-side external conductor 21*b* with the threaded rod 15 and the nut 17 such that the top surface of the suppressing plate 16 is parallel to the bottom surface of the fixed-side external conductor 21*b*. The fixed-side external conductor 21*b* is provided in the bottom portion with a threaded hole along the holding axis direction. The suppressing plate 16 is provided in the central portion with a hole along the holding axis direction. The threaded rod 15 is provided in both end portions with thread grooves. The threaded rod 15 is fixed to the fixed-side external conductor 21*b* by screwing one thread groove into the bottom portion of the fixed-side external conductor 21*b*. The threaded rod 15 is fixed to the suppressing plate 16 by screwing the other thread groove into the nut 17 through the suppressing plate 16. Thus, the threaded rod 15 is fixed to the fixed-side external conductor 21*b* in a state of extending in the axial direction of the fixed-side external conductor 21*b*, that is, the extending direction of the fixed-side external conductor 21*b*.

The threaded rod 15 is fixed to the fixed-side external conductor 21*b* with the spring 18A housed in the middle section 61A and with the spring 18B housed in the lower section 61B. A distal end portion of the thread groove of the threaded rod 15 on the side where the suppressing plate 16 is fixed protrudes from the bottom surface of the suppressing plate 16. The nut 17 is screwed onto the protrusion.

Thus, in the holder 41, the fixed-side external conductor 21*b* and the suppressing plate 16 are fixed with the threaded rod 15 and the nut 17, and the relative positions of the fixed-side external conductor 21*b* and the suppressing plate 16 do not change. The protrusion 62 is fixed to the frame 14P, and the relative positions of the protrusion 62 and the frame 14P do not change. The relative positions of the frame 14P and the fixed-side external conductor 21*b* in the holding axis direction are allowed to change.

In the tank-type circuit breaker 100, for example, when vibration is generated at the time of opening or closing, the vibration is propagated to the frame 14P, and the frame 14P vibrates in the holding axis direction. Consequently, the frame 14P moves upward and downward along the holding axis direction. Furthermore, when the temperature of the fixed-side external conductor 21*b* increases at the time of current-carrying of the tank-type circuit breaker 100, the length of the fixed-side external conductor 21*b* in the holding axis direction increases. When the temperature of the fixed-side external conductor 21*b* decreases, the length of the fixed-side external conductor 21*b* in the holding axis direction returns to the original one.

When the arc-extinguishing chamber 3 moves upward due to the vibration of the tank-type circuit breaker 100, the frame 14P moves upward along the holding axis direction. When the frame 14P moves upward along the holding axis direction, the protrusion 62 also moves upward. Consequently, the protrusion 62 contracts the spring 18A. When the frame 14P tries to move upward along the holding axis direction, the spring 18A suppresses the upward displacement of the frame 14P. That is, when pushed by the protrusion 62, the spring 18A pushes back the protrusion 62 downward by a reaction force. That is, when the frame 14P moves upward, the spring 18A pushes back the frame 14P downward.

When the arc-extinguishing chamber 3 moves downward due to the vibration of the tank-type circuit breaker 100, the frame 14P moves downward along the holding axis direction. When the frame 14P moves downward along the holding axis direction, the protrusion 62 also moves downward. Consequently, the protrusion 62 contracts the spring 18B. When the frame 14P tries to move downward along the holding axis direction, the spring 18B suppresses the downward displacement of the frame 14P. That is, when pushed by the protrusion 62, the spring 18B pushes back the protrusion 62 upward by a reaction force. That is, when the frame 14P moves downward, the spring 18B pushes back the frame 14P upward.

When the temperature of the fixed-side external conductor 21*b* increases, the fixed-side external conductor 21*b* becomes longer in the downward direction with respect to the frame 14P. When the fixed-side external conductor 21*b* becomes longer in the downward direction along the holding axis direction, the fixed-side external conductor 21*b* contracts the spring 18A. When the fixed-side external conductor 21*b* tries to move downward, the spring 18A suppresses the downward displacement of the fixed-side external conductor 21*b*. That is, when pushed by the fixed-side external conductor 21*b*, the spring 18A pushes back the fixed-side external conductor 21*b* upward by a reaction force.

As described above, in the tank-type circuit breaker 100, the fixed-side frame 14 is in mechanical contact with the fixed-side external conductor 21*b* via at least two springs (the springs 18A and 18B). In the tank-type circuit breaker 100 with this structure, even when vibration in the upward direction (top direction) or the downward direction (bottom direction) is generated in the arc-extinguishing chamber 3 during opening or closing operation, the springs 18A and 18B generate resisting forces against vibration components in both of the directions, and suppresses the vibration of the arc-extinguishing chamber 3.

Furthermore, even when the fixed-side external conductor 21*b* increases in temperature and increases in length in the holding axis direction at the time of current-carrying of the tank-type circuit breaker 100, by properly setting the spring constants of the springs 18A and 18B in advance, the increase in the length of the fixed-side external conductor 21*b* is absorbed by the compression of the springs 18A and 18B.

Consequently, the springs 18A and 18B: reduce a load acting on fastened portions of parts constituting the arc-extinguishing chamber 3 and the holder 41; and prevent damage to these parts. The tank-type circuit breaker 100 eliminates the need to provide a fixed-side support insulator between the arc-extinguishing chamber 3 and the grounded tank 1. The arc-extinguishing chamber 3, which is a heavy object, is supported by the fixed-side external conductor 21*b*. Consequently, the tank-type circuit breaker 100 has a small device configuration.

Here, tank-type circuit breakers of comparative examples will be described. In a tank-type circuit breaker of a first comparative example, an object having a certain mass is attached to a distal end portion of a bushing. The tank-type circuit breaker of the first comparative example suppresses the vibration of the entire apparatus by the vibration of this object.

In a tank-type circuit breaker of a second comparative example, an object having a certain mass is attached via an elastic element to a base on which the tank-type circuit breaker is installed. The tank-type circuit breaker of the second comparative example suppresses the vibration of the entire apparatus by the vibration of this object.

In the tank-type circuit breakers of the first and second comparative examples, vibration is isolated by attaching the objects that vibrate. However, the tank-type circuit breakers of the first and second comparative examples cannot suppress the vibration of an arc-extinguishing chamber in a grounded tank, and cannot prevent damage to fastened portions of parts constituting the arc-extinguishing chamber. Furthermore, when a fixed-side external conductor becomes longer, the tank-type circuit breakers of the first and second comparative examples cannot prevent damage to the fastened portions of the parts constituting the arc-extinguishing chamber.

In the first embodiment, elastics other than the springs 18A and 18B may be disposed in the tank-type circuit breaker 100. For example, instead of the springs 18A and 18B, rubber may be disposed in the tank-type circuit breaker 100.

As described above, according to the first embodiment, the fixed-side frame 14 is connected to the fixed-side external conductor 21*b* via at least two elastics arranged in series along the extending direction of the fixed-side external conductor 21*b*, whereby the fixed-side frame 14 is suspended and supported by the fixed-side external conductor 21*b*. Consequently, the tank-type circuit breaker 100 prevents the fastened portions of the parts from being damaged with the small device configuration.

Second Embodiment

Next, a second embodiment will be described with reference to FIG. 3. In the second embodiment, instead of the protrusion 62, an annular plate is joined to the frame 14P.

Figure 3:
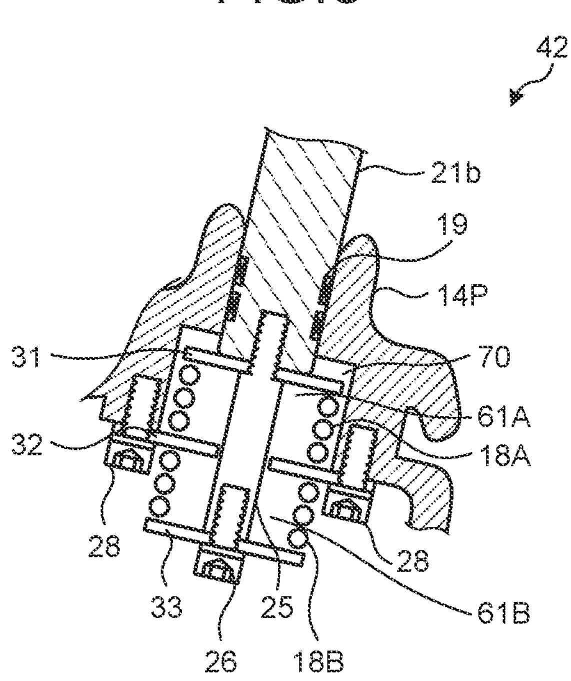
FIG. 3 is a diagram illustrating a configuration of a holder included in a tank-type circuit breaker according to a second embodiment.

FIG. 3 is a diagram illustrating a configuration of a holder included in a tank-type circuit breaker according to the second embodiment. Of components in FIG. 3, components that achieve the same functions as those of the holder 41 included in the tank-type circuit breaker 100 of the first embodiment illustrated in FIG. 2 are assigned the same reference numerals without duplicated explanations.

In the tank-type circuit breaker 100 of the second embodiment, the arc-extinguishing chamber 3 is supported in the grounded tank 1 using a holder 42 disposed on the fixed side. The holder 42 includes: the fixed-side frame 14 (the frame 14P is illustrated in FIG. 3); the springs 18A and 18B, which are elastics; the current-carrying contact 19; bolts 26 and 28; a top plate 31; a middle plate 32; and a bottom plate 33. The bottom surface of the top plate 31 faces the top surface of the middle plate 32; and the bottom surface of the middle plate 32 faces the top surface of the bottom plate 33. The bottom surface of the top plate 31 is parallel to the top surface of the middle plate 32; and the bottom surface of the middle plate 32 is parallel to the top surface of the bottom plate 33. In the second embodiment, the middle plate 32 is an annular portion.

In the holder 42, the middle plate 32 in the shape of a plate is disposed between the middle section 61A and the lower section 61B. The middle plate 32 is formed of an annular plate and is joined to the frame 14P. The top surface and the bottom surface of the middle plate 32 are parallel to a plane perpendicular to the inner wall surface of the frame 14P forming the cylindrical area. The inner area of the annular middle plate 32 is a disk-shaped space, through which the bolt 26 is passed. The middle plate 32 prevents collisions between the spring 18A and the spring 18B.

The middle plate 32 is provided in the outer peripheral portion with a plurality of holes for passing the bolts 28. The frame 14P is provided with a plurality of threaded holes extending in a direction parallel to the holding axis direction for fastening the bolts 28. The bolts 28 are passed through the holes provided in the middle plate 32 and the threaded holes provided in the frame 14P. The bolts 28 are screwed into the threaded holes in the frame 14P. Consequently, the middle plate 32 is fixed to the frame 14P by the bolts 28.

The top plate 31 is provided in the central portion with a hole for passing a bolt 25. The fixed-side external conductor 21*b* is provided with a threaded hole extending in the holding axis direction for fastening the bolt 25. The bolt 25 is passed through the hole provided in the top plate 31 and the threaded hole provided in the fixed-side external conductor 21*b*. The bolt 25 is screwed into the threaded hole in the fixed-side external conductor 21*b*. Consequently, the top plate 31 is fixed to the fixed-side external conductor 21*b* by the bolt 25.

The bottom plate 33 is provided in the central portion with a hole for passing the bolt 26. The bolt 25 is provided with a threaded hole extending in the holding axis direction for fastening the bolt 26. The bolt 26 is passed through the hole provided in the bottom plate 33 and the threaded hole provided in the bolt 25. The bolt 26 is screwed into the threaded hole in the bolt 25. Consequently, the bottom plate 33 is fixed to the bolt 25 by the bolt 26.

Thus, in the holder 42, the top plate 31 and the bottom plate 33 are fixed to the fixed-side external conductor 21*b*, and the frame 14P is fixed to the middle plate 32. Consequently, the relative positions of the fixed-side external conductor 21*b*, the top plate 31, and the bottom plate 33 do not change. The relative positions of the middle plate 32 and the frame 14P do not change. The relative positions of the frame 14P and the fixed-side external conductor 21*b* in the holding axis direction are allowed to change.

In the holder 42, similarly to the holder 41, the spring 18A is disposed in the middle section 61A, and the spring 18B is disposed in the lower section 61B. The bottom side of the spring 18A is pressed against the top surface (the fixed-side external conductor 21*b* side) of the middle plate 32. The top side of the spring 18B is pressed against the bottom surface of the middle plate 32. The top side of the spring 18A is pressed against the bottom surface of the top plate 31. The bottom side of the spring 18B is pressed against the top surface of the bottom plate 33.

Thus, in the holder 42, the spring 18A is pushed from the bottom side of the spring 18A using the middle plate 32 instead of the protrusion 62. In the holder 42, the spring 18B is pushed from the top side of the spring 18B using the middle plate 32 instead of the protrusion 62.

In the holder 42, the spring 18A is pushed from the top side of the spring 18A using the top plate 31 instead of the fixed-side external conductor 21*b*. In the holder 42, the spring 18B is pushed from the bottom side of the spring 18B using the bottom plate 33 instead of the suppressing plate 16.

This configuration allows the holder 42 to maintain an electrical connection between the frame 14P and the fixed-side external conductor 21*b* like the holder 41 even when the positions of the frame 14P and the fixed-side external conductor 21*b* in the holding axis direction change.

In the second embodiment, since the tank-type circuit breaker 100 includes the holder 42, even when vibration in the upward direction or the downward direction is generated in the arc-extinguishing chamber 3 during opening or closing operation, the springs 18A and 18B generate resisting forces against vibration components in both of the directions, and suppresses the vibration of the arc-extinguishing chamber 3 as in the first embodiment.

Furthermore, even when the fixed-side external conductor 21*b* increases in temperature and increases in length in the holding axis direction at the time of current-carrying of the tank-type circuit breaker 100, by properly setting the spring constants of the springs 18A and 18B in advance, the increase in the length of the fixed-side external conductor 21*b* is absorbed by the compression of the springs 18A and 18B.

A clearance 70 is provided between the top surface of the top plate 31 and a surface of the frame 14P facing the top surface of the top plate 31. The clearance 70 is provided for avoiding collisions between the top plate 31 and the frame 14P due to improper settings of tolerances of parts and shrinkage of the fixed-side external conductor 21*b*.

As described above, according to the second embodiment, in which the tank-type circuit breaker 100 includes the holder 42, the tank-type circuit breaker 100 prevents the fastened portions of the parts from being damaged with a small device configuration as in the first embodiment.

The configurations described in the above embodiments illustrate an example, and can be combined with another known art. The embodiments can be combined with each other. The configurations can be partly omitted or changed without departing from the gist.

REFERENCE SIGNS LIST

1 grounded tank; 2*a* movable-side flange; 2*b* fixed-side flange; 3 arc-extinguishing chamber; 4 vacuum valve; 5*a* movable-side contact; 5*b* fixed-side contact; 8 contact pressure spring; 9 movable-side insulating support tube; 10 operating device; 11 connecting mechanism; 12 insulated operating rod; 13 movable-side frame; 14 fixed-side frame; 14P frame; 15 threaded rod; 16 suppressing plate; 17 nut; 18A, 18B spring; 19 current-carrying contact; 20*a* movable conductor; 20*b* fixed conductor; 21*a* movable-side external conductor; 21*b* fixed-side external conductor; 22*a* movable-side branch pipe; 22*b* fixed-side branch pipe; 23, 25, 26, 28 bolt; 31 top plate; 32 middle plate; 33 bottom plate; 41, 42 holder; 61A middle section; 61B lower section; 62 protrusion; 70 clearance; 100 tank-type circuit breaker.

The invention claimed is:

1. A circuit breaker, comprising:

a cylindrical grounded tank in which an insulating gas is sealed;

a contact insulated and supported in the grounded tank and including a movable-side contact and a fixed-side contact;

a movable conductor electrically connected to the movable-side contact;

a fixed conductor electrically connected to the fixed-side contact;

a movable-side external conductor and a fixed-side external conductor disposed in a pair of bushings extending above the grounded tank, respectively;

a movable-side frame configured to electrically connect a lower end of the movable-side external conductor to the movable conductor;

a fixed-side frame configured to electrically connect a lower end of the fixed-side external conductor to the fixed conductor;

a movable-side insulating support tube configured to insulate and support the movable-side frame in the grounded tank;

an annular portion formed of an annular plate and fixed at an outer peripheral portion to the fixed-side frame inside the fixed-side frame;

a rod fixed to a distal end portion of the fixed-side external conductor and extending in an extending direction of the fixed-side external conductor; and an annular suppressing plate fixed at a central portion to a distal end portion of the rod, wherein the fixed-side frame and the fixed-side external conductor are connected via at least two elastics arranged in series along the extending direction of the fixed-side external conductor, so that the fixed-side frame is suspended and supported by the fixed-side external conductor, and wherein the elastics include a first elastic and a second elastic configured to generate, when compressed, a reaction force in a direction opposite to a compressed direction;

the first elastic is disposed between the fixed-side external conductor and the annular portion; and the second elastic is disposed between the annular portion and the annular suppressing plate.

2. The circuit breaker according to claim 1, wherein the elastics are coil springs or disc springs.

3. The circuit breaker according to claim 1, wherein the contact is a vacuum valve.

4. The circuit breaker according to claim 1, wherein the fixed-side frame includes an inner wall surface forming a cylindrical area;

the lower end of the fixed-side external conductor is inserted into the cylindrical area movably along an axial direction;

the at least two elastics are arranged in series from a lower end side of the fixed-side external conductor along the extending direction of the fixed-side external conductor; and an outer wall surface of the fixed-side external conductor and the inner wall surface of the fixed-side frame are electrically connected via a current-carrying contact.

5. The circuit breaker according to claim 4, wherein the annular portion is a protrusion protruding from the inner wall surface of the fixed-side frame toward a central portion of the cylindrical area.

* * * * *